US010693973B2

(12) United States Patent
Li

(10) Patent No.: US 10,693,973 B2
(45) Date of Patent: Jun. 23, 2020

(54) SYSTEM AND METHOD FOR WORK DISTRIBUTION IN A FOG NETWORK VIA CODE OFFLOADING

(71) Applicant: Wistron AiEDGE Corporation, San Jose, CA (US)

(72) Inventor: Shunge Li, Duluth, GA (US)

(73) Assignee: Wistron AiEDGE Corporation, San Jose, CA (US)

( * ) Notice: Subject to any disclaimer, the term of this patent is extended or adjusted under 35 U.S.C. 154(b) by 230 days.

(21) Appl. No.: 15/647,250

(22) Filed: Jul. 11, 2017

(65) Prior Publication Data

US 2018/0020062 A1 Jan. 18, 2018

Related U.S. Application Data

(60) Provisional application No. 62/363,385, filed on Jul. 18, 2016.

(51) Int. Cl.
*H04L 29/08* (2006.01)
*H04W 4/70* (2018.01)

(52) U.S. Cl.
CPC ............ *H04L 67/148* (2013.01); *H04L 67/10* (2013.01); *H04L 67/12* (2013.01); *H04W 4/70* (2018.02)

(58) Field of Classification Search
CPC ........ H04W 4/70; H04L 67/10; H04L 67/104; H04L 67/12; H04L 67/148
See application file for complete search history.

(56) References Cited

U.S. PATENT DOCUMENTS

| 8,595,284 B2* | 11/2013 | Sheshagiri ................ G06F 8/51 709/201 |
| 10,055,578 B1* | 8/2018 | Marquardt ............ G06F 21/602 |
| 10,243,878 B2* | 3/2019 | Byers ...................... H04L 67/10 |
| 2003/0154239 A1* | 8/2003 | Davis .................. H04L 63/0227 709/201 |
| 2010/0179942 A1 | 7/2010 | Wallis |

(Continued)

OTHER PUBLICATIONS

Alan Messer et al., "Towards a Distributed Platform for Resouce-Constrained Devices", 2002, In Proc. of the International Conference on Distributed Computing Systems (Year: 2002).*

(Continued)

*Primary Examiner* — Aaron N Strange
(74) *Attorney, Agent, or Firm* — Wei Wei Jeang; Grable Martin Fulton PLLC

(57) ABSTRACT

A fog network includes a first fog network node configured to execute an application program, and a second fog network node configured to host a container. The first fog network node is configured to determine a need to offload at least a portion of the application program for execution in the second fog network node, access a registry to identify and locate a container image created from executable code of the application program stored in the fog network, and load the identified container image in the second fog network node. The second fog network node is configured to start the container in response to the container image being loaded, execute the executable code of the application program, and return a result from executing the executable code of the application program to the first fog network node.

15 Claims, 4 Drawing Sheets

(56) References Cited

U.S. PATENT DOCUMENTS

| | | | |
|---|---|---|---|
| 2011/0213859 A1* | 9/2011 | Greene | G06Q 10/063112 709/218 |
| 2017/0180346 A1* | 6/2017 | Suarez | G06F 9/45558 |
| 2017/0337091 A1* | 11/2017 | Liu | G06F 9/5038 |
| 2018/0124068 A1* | 5/2018 | Ruhlen | H04L 63/108 |

OTHER PUBLICATIONS

Song Wu et al., "Container-Based Cloud Platform for Mobile Computation Offloading", 2017, In Proc. of 2017 IEEE International Parallel and Distributed Processing Symposium (Year: 2017).*

Mahir Kaya et al., "A Mobile Computing Framework Based on Adaptive Mobile Code Offloading", 2014, In Proc. of 2014 40th Euromicro Conference on Software Engineering and Advanced Applications (Year: 2017).*

Jiao et al., "Cloud-based Computation Offloading for Mobile Devices: State of the Art, Challenges and Opportunities", 2013, In Proc. of Future Network and MobileSummit 2013 (Year: 2013).*

Yi et al., "Fog Computing: Platform and Applications", 2015, In. Proc. of 2015 Third IEEE Workshop on Hot Topics in Web Systems and Technologies (Year: 2015).*

Gupta, H. et al., "Chapter 1—Fog Computing in 5G Networks: An Application Perspective," Department of Computer Science and Engineering, Online Publication Apr. 5, 2016, Retrieved on Sep. 12, 2017, 36 pages.

International Search Report and Written Opinion received in corresponding Patent Cooperation Treaty Application No. PCT/US2017/042680, dated Sep. 29, 2017, 6 pages.

Cuervo, E. et al., "MAUI: Making Smartphones Last Longer With Code Offload," 8th International Conference on Mobile Systems, Applications, and Services (Mobisys'10), Jun. 2010, 14 pages.

Flores, H. et al., "Mobile Code Offloading: From Concept to Practice and Beyond," IEEE Communications Magazine, vol. 53, Issue: 3, Mar. 18, 2015, pp. 80-88.

Gordan, M. S. et al., "COMET: Code Offload by Migrating Execution Transparently," 10th USENIX Symposium on Operating Systems Design and Implementation, Oct. 8-10, 2012, pp. 93-106.

Satyanarayanan, M. et al., "The Case for VM-Based Cloudlets in Mobile Computing," IEEE Pervasive Computing, vol. 8, Issue 4, Oct. 2009, pp. 14-23.

Simanta, S. et al., "A Reference Architecture for Mobile Code Offload in Hostile Environments," Software Architecture (WICSA) and European Conference on Software Architecture (ECSA), Aug. 20-24, 2012, 20 pages.

Akherfi, K. et al., "Mobile cloud computing for computation offloading: Issues and challenges," Applied Computing and Informatics 2017, Nov. 28, 2017, 16 pages.

Wu, S. et al., "Container-Based Cloud Platform for Mobile Computation Offloading," Parallel and Distributed Processing Symposium (IPDPS), 2017 IEEE International, Orlando, FL, May 29-Jun. 2, 2017, pp. 123-132.

* cited by examiner

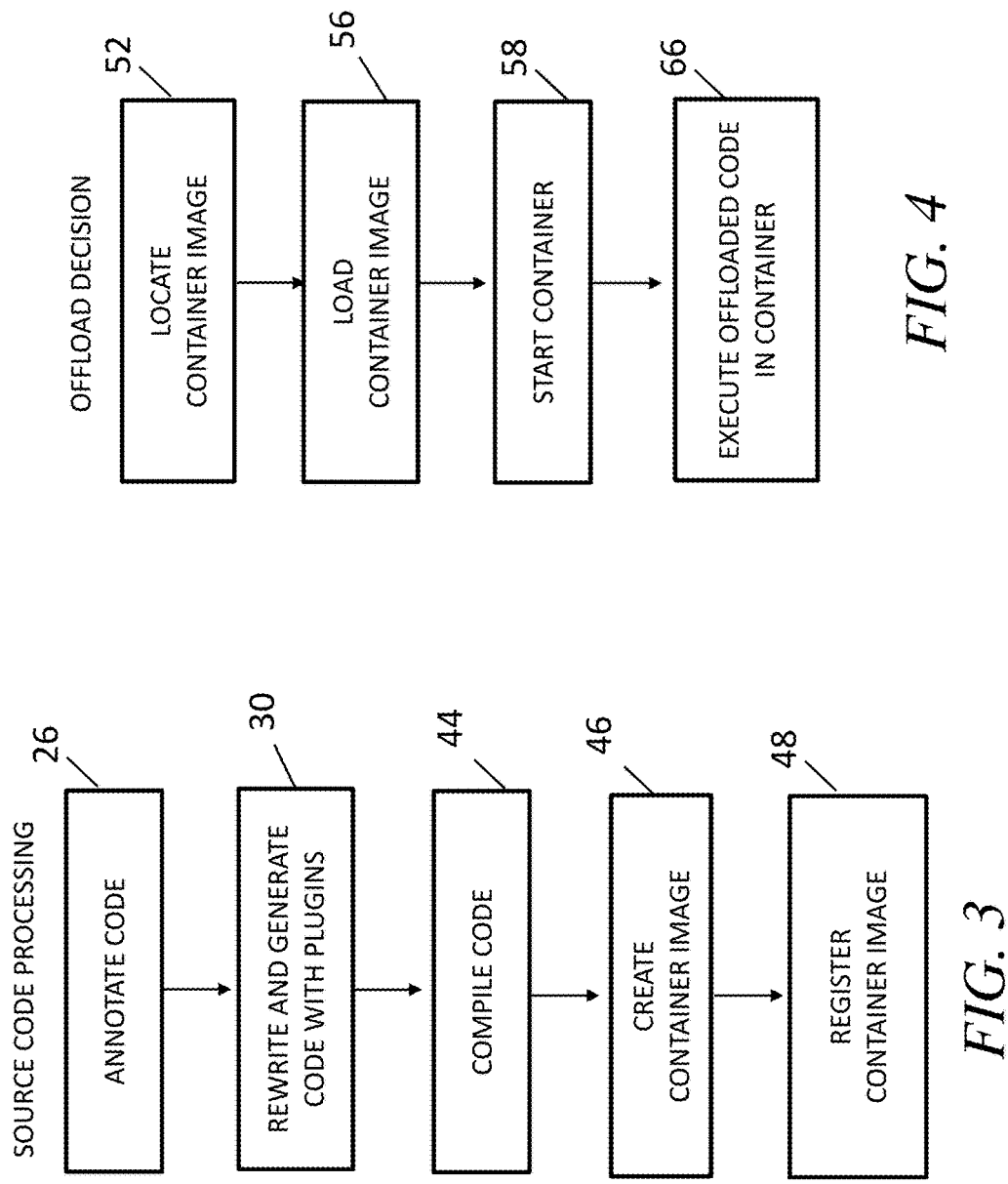

US 10,693,973 B2

SYSTEM AND METHOD FOR WORK DISTRIBUTION IN A FOG NETWORK VIA CODE OFFLOADING

RELATED APPLICATION

The present disclosure claims the benefit of U.S. Provisional Patent Application No. 62/363,385 filed on Jul. 18, 2016, which is incorporated herein in its entirety.

FIELD

The present disclosure relates to fog networks and particularly to a system and method for work distribution in a fog network.

BACKGROUND

The Internet of Things (IoT) is the network of physical objects, devices, or "things" embedded with electronics, software, sensors, and network connectivity, which enables these "things" to exchange data, collaborate, and share resources. Fog computing or fog networking, also known as fogging, is an architecture that uses one or a collaborative multitude of end-user clients or near-user edge devices to carry out a substantial amount of storage (rather than stored primarily in cloud data centers), communication (rather than routed over the internet backbone), and control, configuration, measurement and management (rather than controlled primarily by network gateways such as those in the LTE core). Fog networking supports the Internet of Things, in which most of the devices that we use on a daily basis will be connected to each other. Examples include mobile phones, wearable devices, connected vehicles, augmented reality devices, sensors, and appliances. Due to the nature of their application domains, these IoT devices typically have severe constraints for computing resources, memory, and power consumption.

BRIEF DESCRIPTION OF THE DRAWINGS

FIG. 3 is a simplified flowchart of an exemplary embodiment of a process to prepare software code for offloading in a fog network according to the teachings of the present disclosure;

FIG. 4 is a simplified flowchart of an exemplary embodiment of a process of work distribution in a fog network according to the teachings of the present disclosure.

DETAILED DESCRIPTION

Figure 1:
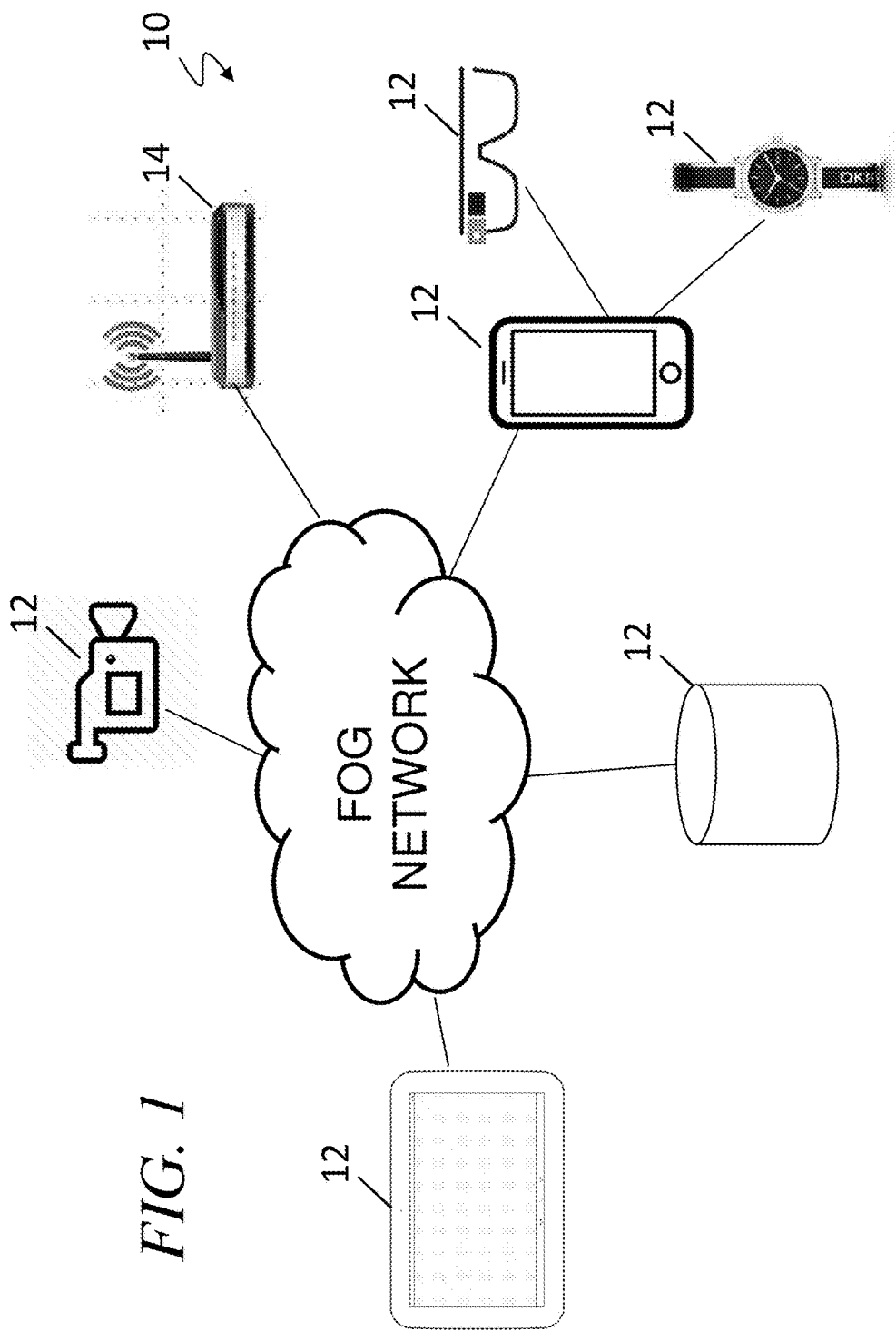
FIG. 1 is a simplified block diagram of an exemplary embodiment of a fog network according to the teachings of the present disclosure.

The past few years have witnessed a rapid growth of mobile and IoT applications, and computation-intensive applications for interactive gaming, augmented reality, virtual reality, image processing and recognition, artificial intelligence, and real-time data analytics applications. These applications are resource-hungry and require intensive computing power and fast or real-time response times. Due to the nature of their application domain and physical size constraints, many IoT devices (e.g., mobile phones, wearable devices, connected vehicles, augmented reality devices, sensors, and appliances) are computing resource-constrained, thus giving rise to significant challenges for next generation mobile and IoT app development. FIG. 1 is a simplified block diagram of an exemplary embodiment of a fog network 10 according to the teachings of the present disclosure. The fog network 10 includes a variety of IoT devices or fog nodes 12 that are connected to one another through wired or wireless networks such as using short-range communications (e.g., WiFi, Wi-Fi Direct, ZigBee, Bluetooth, and ethernet communications). These IoT devices 12 may be operating in client-server or peer-to-peer configurations. Code offloading is a concept that has been contemplated for certain mobile and IoT applications to address limited computing and energy resources for certain devices. The approach described herein uses container technology for one fog network node to offload the execution of software code to another node in the same fog network. The container technology described herein is an extremely lightweight way to implement runtime environment creation and management compared to the use of virtual machines, and is especially suitable for resource-constrained IoT devices in a fog network. Due to the close proximity between nodes in a fog network, latency attributable to transferring code and code execution results is insignificant.

Figure 2:
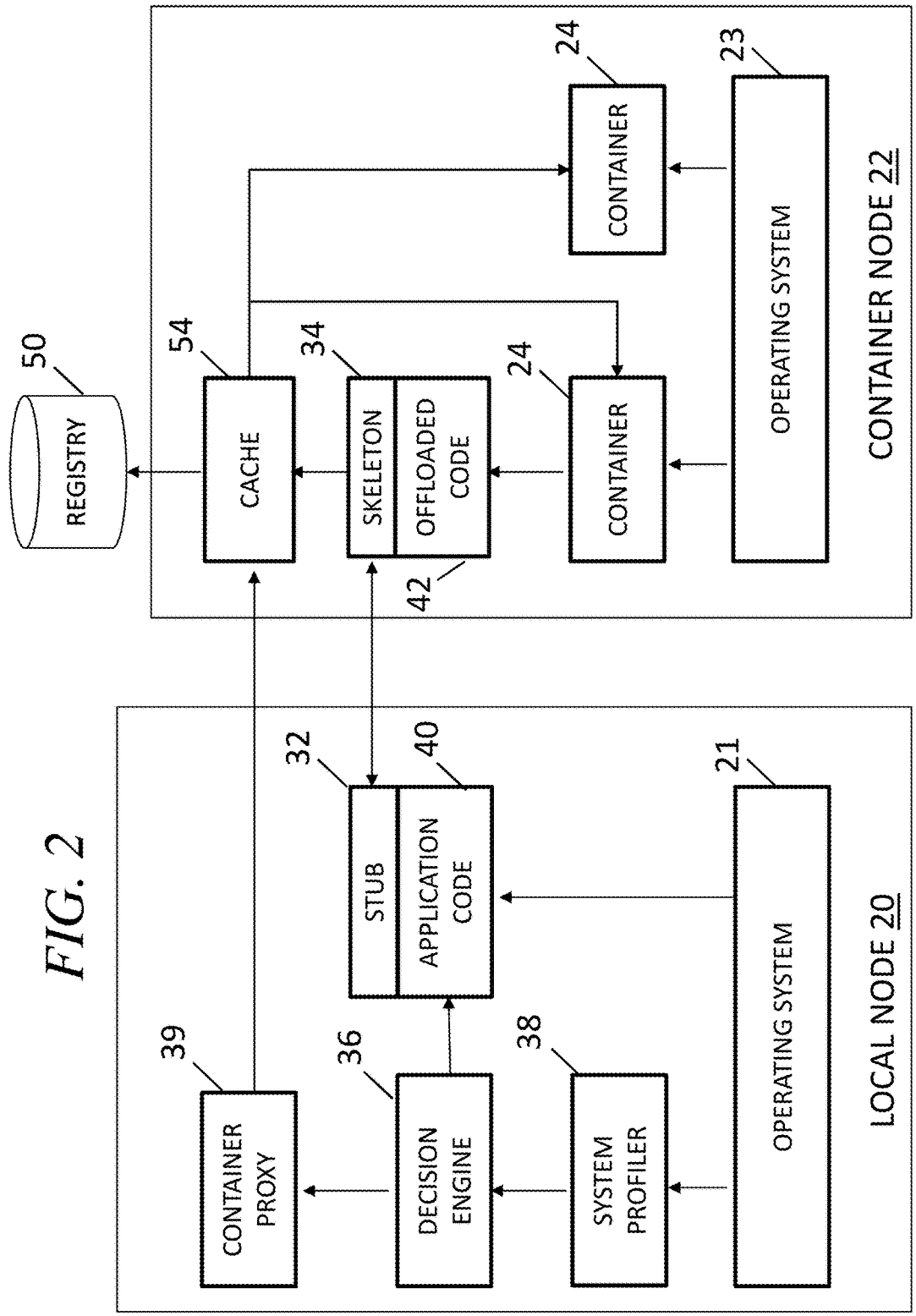
FIG. 2 is a simplified block diagram of an exemplary embodiment of a system and method for work distribution in a fog network according to the teachings of the present disclosure.

FIG. 2 is a simplified block diagram of the software architecture involved for implementing a system and method for work distribution in a fog network by using code offloading. A node in the fog network with resource constraint and in need of code offloading is referred to herein as the local node 20, and the node that executes the offloaded code is referred to herein as the container node 22. The container node 22 is a node that is located proximal to the local node 20 in the same fog network hosting a container 24 that is configured to provide a runtime environment for offloaded code execution. FIG. 2 shows the local node 20 and the container node 22 with their respective operating systems 21 and 23. Depending on the size of the fog network and other factors, a fog node can be configured to host one or more containers to support the offloading of multiple applications. In an exemplary embodiment, an IoT gateway 14 in the fog network may be configured to host one or more containers for code offloading purposes for other nodes or devices 12 in the network.

Referring also to FIG. 3 for a simplified flowchart of an exemplary embodiment of a process to prepare software code for offloading in a fog network 10, the process begins at code development by annotating the software program that has been anticipated to be offloaded either entirely or in part, as shown in block 26. The annotation process designates or labels portions of the software code the execution of which can be offloaded to another node. The labeling can be done at function, method, API (Application Programming Interface), or program level. Code that is a suitable candidate for offloading include, but are not limited to, non-user interface portions of mobile apps, computation-intensive tasks, service-based or microservice-based tasks, and tasks that are better performed on specialized platforms. The annotated code is then rewritten with plugins, as shown in block 30. The rewriting process includes using a text processor that automatically parses the source code to identify the annotated code that have been designated or labeled as offloadable code. Wrapper functions that contain a stub 32 for the local node 20 and a corresponding skeleton 34 for the container node 22 are also generated. The stub 32 and skeleton 34 are objects for implementing a communication channel between the local and container nodes, and provide functionality that ensures reliable communication over the network. The stub 28 and skeleton 30 are responsible for transferring code and execution results between the local and container nodes 20 and 22. Stub and skeleton communication mechanisms include, but are not limited to, COBRA (Common Object Request Broker Architecture), RPC (Remote Procedural Call), RMI (Remote Method Invocation), SOAP (Simple Object Access Protocol), REST (REpresentational State Transfer) APIs, microservices, etc. The local wrapper function also includes a decision engine plugin 36 that works with the system profiler 38 at runtime to determine if and when offloadable code is to be offloaded to the container node for execution. The code annotation and rewriting steps are done ahead of program runtime in preparation for the possibility of code offloading to ease computing bottlenecks.

The rewritten code is then compiled into two sets of executable code, one for the local node 20 and one for the container node 22, as shown in block 44. The executable for the local node includes the stub, and the executable for the container node includes the skeleton. The compiling step is also done ahead of program runtime in anticipation for code offloading. It should be noted that compilation is not needed for application code written in scripting languages. A container image for the target operating system of the container node is then created, and the container image is registered in a public and/or private registry, as shown in blocks 46 and 48. Registration allows a local node to discover and locate the container image when code offloading occurs at runtime. The container image 24 includes a runtime environment as well as the context in which the offloaded code will run. Data associated with the container image file 24 is also registered with or stored in a private or public registry 50. A fog network can have its own private registry to host all of the container images required by its fog nodes. Meta data that can be used to uniquely identify the offloaded application is also stored in the registry 50. The registry 50 thus maintains a record of available container images in the fog network. The steps in FIG. 3 are performed at code development and code deployment times.

FIG. 4 is a simplified flowchart of an exemplary embodiment of a runtime offloading decision process in a system and method for work distribution in a fog network using a code offloading technique according to the teachings of the present disclosure. Referring also to FIG. 2, at runtime, the system profiler 38 of the local node 20 dynamically monitors and measures local resource states, so that the decision engine 36 may use this information to determine whether there is a need or desire for code offloading based on these and other factors. When a determination is made that code offloading is needed or desired, and when the decision engine 36 decides to offload a portion of code to a nearby container node, a container proxy 39 can identify and locate an appropriate container image by querying the registry 50, as shown in block 52. The decision to select a container node can also take into account connectivity status between the local node 20 and other nodes in the network. The selected target container node 22 may maintain a cache 54 for container images that it has executed recently, in which case the container proxy 39 checks the cache 54 first before querying the registry 50. Once a copy of the container image is found, it is loaded to the target container node 22 if not already there, as shown in block 56. The container 24, which is an instance of the loaded container image, is then started, as shown in block 58. The offloaded code 42 is then executed in the container 24, as shown in block 60. The stub 32 on the local node 20 invokes the offloaded code 42 or function through the skeleton 34 on the identified container node 22 with a set of arguments. The offloaded code 42 is then executed on the container node 22 and the results are sent back to the local node 20 through the same stub-skeleton communication mechanism.

It may be seen that code offloading latency for the process described includes the time spent in locating and loading the container image as well as starting the container. This is a dynamic on-demand container binding strategy that offers a greater degree of flexibility because the local node can choose the best node to host a container from a cluster of available container nodes. This approach also yields better utilization of container resources. However, this strategy also has the highest code offloading latency.

A second container binding scheme creates a container in advance for a piece of potentially offloadable code. This static container binding approach ensures guaranteed resources for offloaded code execution and also removes the container creation time from overall code offloading latency. The disadvantage associated with this scheme is a potential waste of resources if the container is not utilized or underutilized most of the time.

Figure 5:
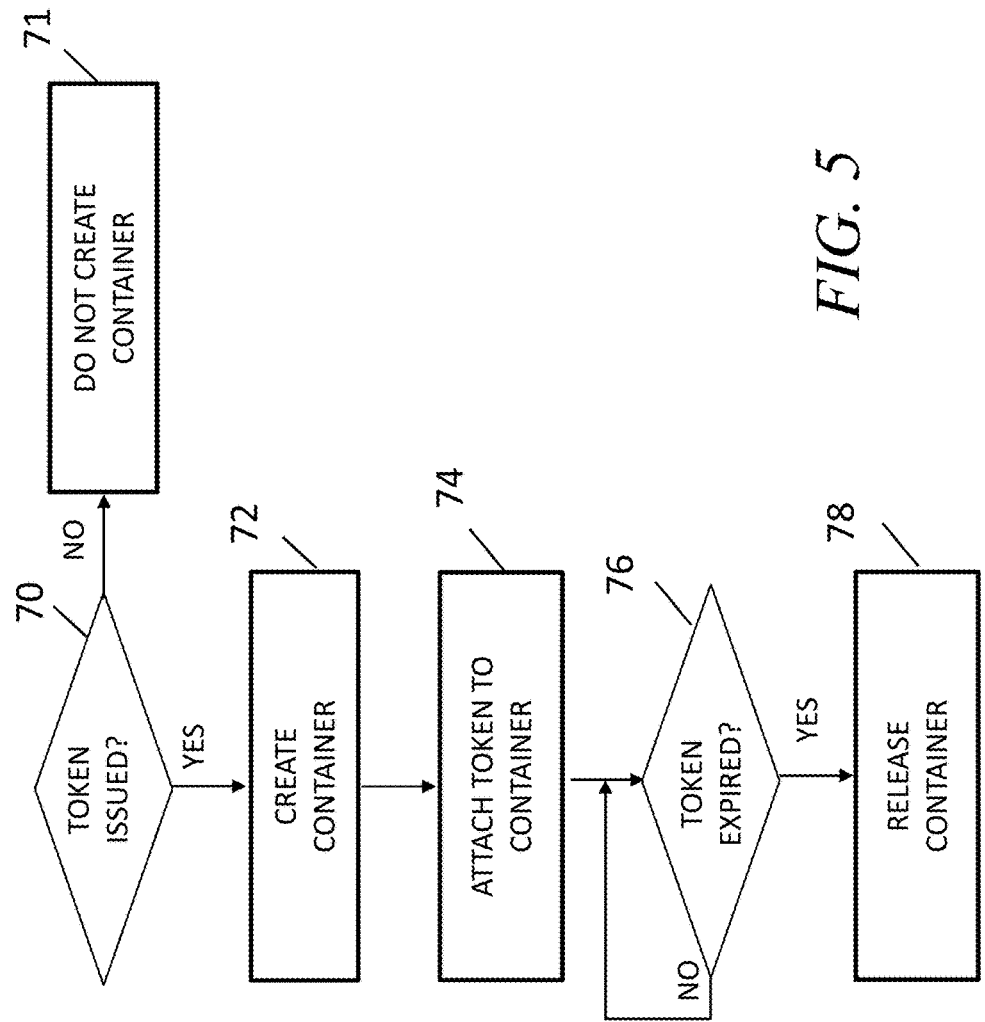
FIG. 5 is a simplified flowchart of an exemplary embodiment of a token-based container binding process for code offloading in a fog network according to the teachings of the present disclosure.

A third container binding scheme entails creating a container in advance and it is reserved for a certain period of time. FIG. 5 is a simplified flowchart of an exemplary embodiment of a token-based container binding process for code offloading in a fog network according to the teachings of the present disclosure. In block 70, a determination is made as to whether a token is issued based on resource availability of a container node 22. If there are insufficient resources, no action is taken, as shown in block 71. The token is used as an admission control mechanism where no token is issued if insufficient resources is available to create a container. If a token is granted, then a container is created, as shown in block 72. The token is then attached to the created container, as shown in block 74. The token has a validity period and expires after this period lapses. A container remains in effect if its associated token is unexpired or is renewed to avoid expiration. The container is released if the token is not renewed and expires, as shown in blocks 76 and 78. This token-based hybrid approach balances the latency and resource utilization concerns.

It should be noted that some offloading schemes use virtual machines (VMs) to host mobile operating systems in the cloud. Hardware virtualization allows different guest operating systems to co-exist in the cloud platform. The main drawbacks of using VMs in the mobile cloud are the long VM startup time, high virtualization overhead, and high runtime latency. Interactivity and mobility are the keys to the success of mobile cloud computing, but heavyweight VM solutions cannot meet these requirements. Though pre-starting VMs can reduce the VM startup time, it would inevitably incur high resource cost because VMs often contain unnecessary resource elements for offloaded code execution. Moreover, the runtime latency would remain high if VMs are hosted in the cloud. In comparison, containers are lightweight and the use of token-based binding schemes can help to alleviate latency and resource utilization concerns.

The features of the present invention which are believed to be novel are set forth below with particularity in the appended claims. However, modifications, variations, and changes to the exemplary embodiments described above will be apparent to those skilled in the art, and the system and method for work distribution using a code offloading technique in a fog network described herein thus encompasses such modifications, variations, and changes and are not limited to the specific embodiments described herein.

What is claimed is:

1. A method comprising:
   determining whether resources are available at a second fog network node for code offloading;
   granting a token in response to determining resources are available;
   creating a container for the second fog network node in response to grant of an unexpired token;
   attaching the unexpired token to the created container;
   designating an application program for execution on a first fog network node;
   determining a need to offload execution of at least one portion of the application program for execution in the second fog network node;
   accessing a registry to identify and locate a container image;
   loading the identified container image in the second fog network node;
   starting a container hosted by the second fog network node in response to the container image being loaded;
   executing a second executable of the application program in the second fog network node; and
   returning a result from executing the second executable in the second fog network node to the first fog network node.

2. The method of claim 1, wherein determining a need to offload execution comprises monitoring operating status of the first fog network node.

3. The method of claim 1, further comprising creating a bi-directional communication channel between the first and second fog network nodes for exchanging execution control and the result.

4. The method of claim 1, wherein determining a need to offload execution comprises monitoring operating status of the bi-directional communication channel and resource utilization status of the first fog network node.

5. The method of claim 1, further comprising using a stub and skeleton configured for creating a bi-directional communication channel between the first and second fog network nodes for exchanging execution control and the result.

6. The method of claim 1, further comprising creating the container ahead of determining the need for offloading execution of the at least one portion of the application program.

7. The method of claim 1, further comprising creating a container dynamically in response to determining the need for offloading execution of the at least one portion of the application program.

8. A method comprising:
   determining a need to offload execution of at least one portion of an application program for execution in a first fog network node to a second fog network node;
   accessing a registry to identify and locate a container image created from an executable code of the at least one portion of the application program;
   loading the identified container image in the second fog network node;
   starting a container hosted by the second fog network node in response to the container image being loaded;
   executing the executable code of the application program in the second fog network node; and
   returning a result from executing the executable code in the second fog network node to the first fog network node;
   creating a container for the second fog network node in response to grant of an unexpired token; and
   attaching the unexpired token to the created container.

9. The method of claim 8, comprising:
   designating the at least one portion of the application program for execution on the first fog network node that is ideal candidate for execution in the second fog network node;
   creating a first executable of the application program for execution on the first fog network node and a second executable of the at least one portion of the application program for execution on the second fog network node;
   creating the container image from the second executable for an operating system on the second fog network node; and
   registering the container image in the registry.

10. The method of claim 9, further comprising creating a container ahead of determining the need for offloading execution of the at least one portion of the application program.

11. The method of claim 9, further comprising creating a container dynamically in response to determining the need for offloading execution of the at least one portion of the application program.

12. The method of claim 8, wherein determining a need to offload execution comprises monitoring resource utilization of the first fog network node.

13. The method of claim 8, further comprising creating a bi-directional communication channel between the first and second fog network nodes for exchanging execution control and the result.

14. The method of claim 13, wherein determining a need to offload execution comprises monitoring operating status of the bi-directional communication channel.

15. The method of claim 8, further comprising using a stub and skeleton configured for creating a bi-directional communication channel between the first and second fog network nodes for exchanging execution control and the result.

* * * * *